UNITED STATES PATENT OFFICE.

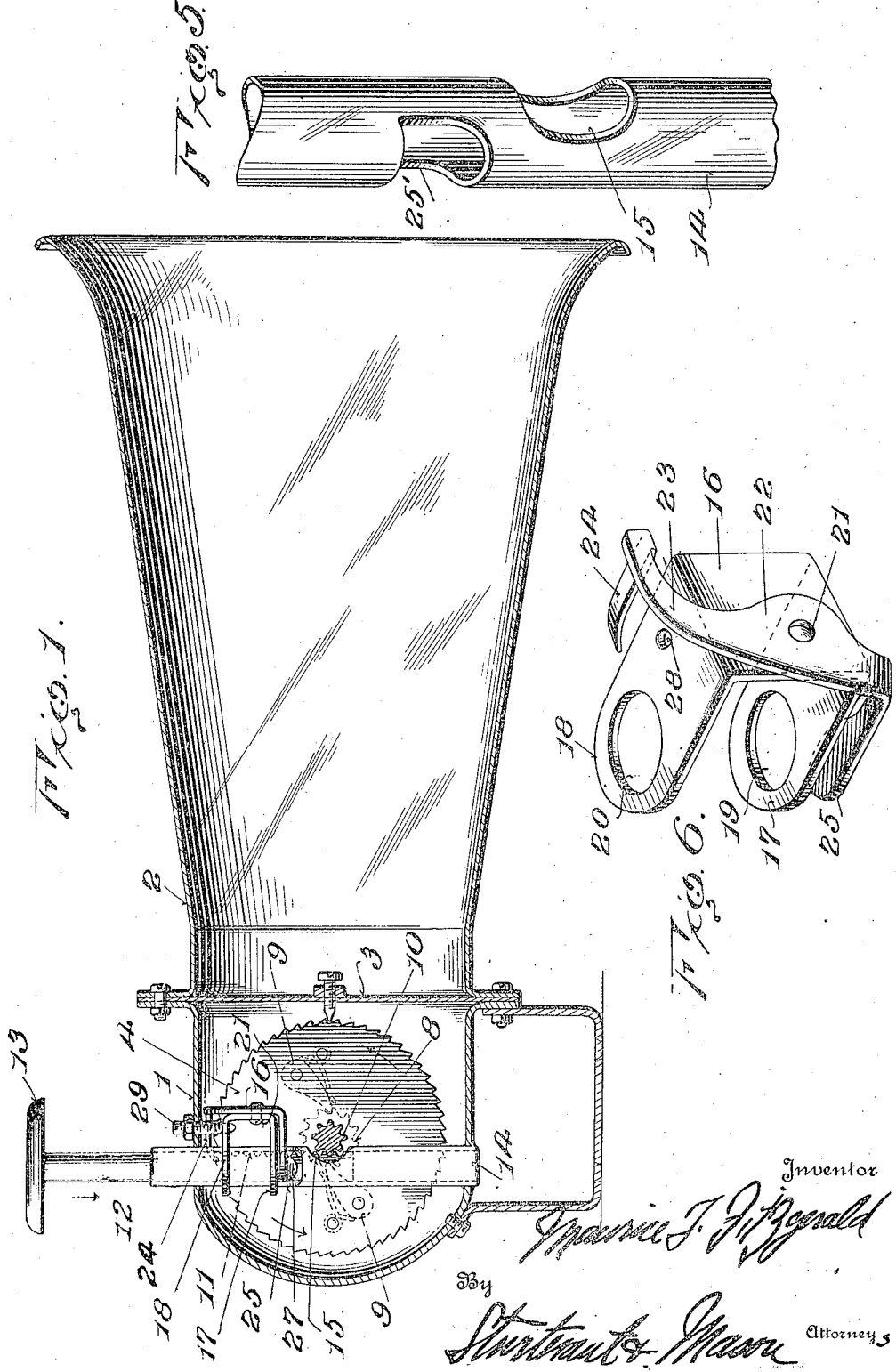

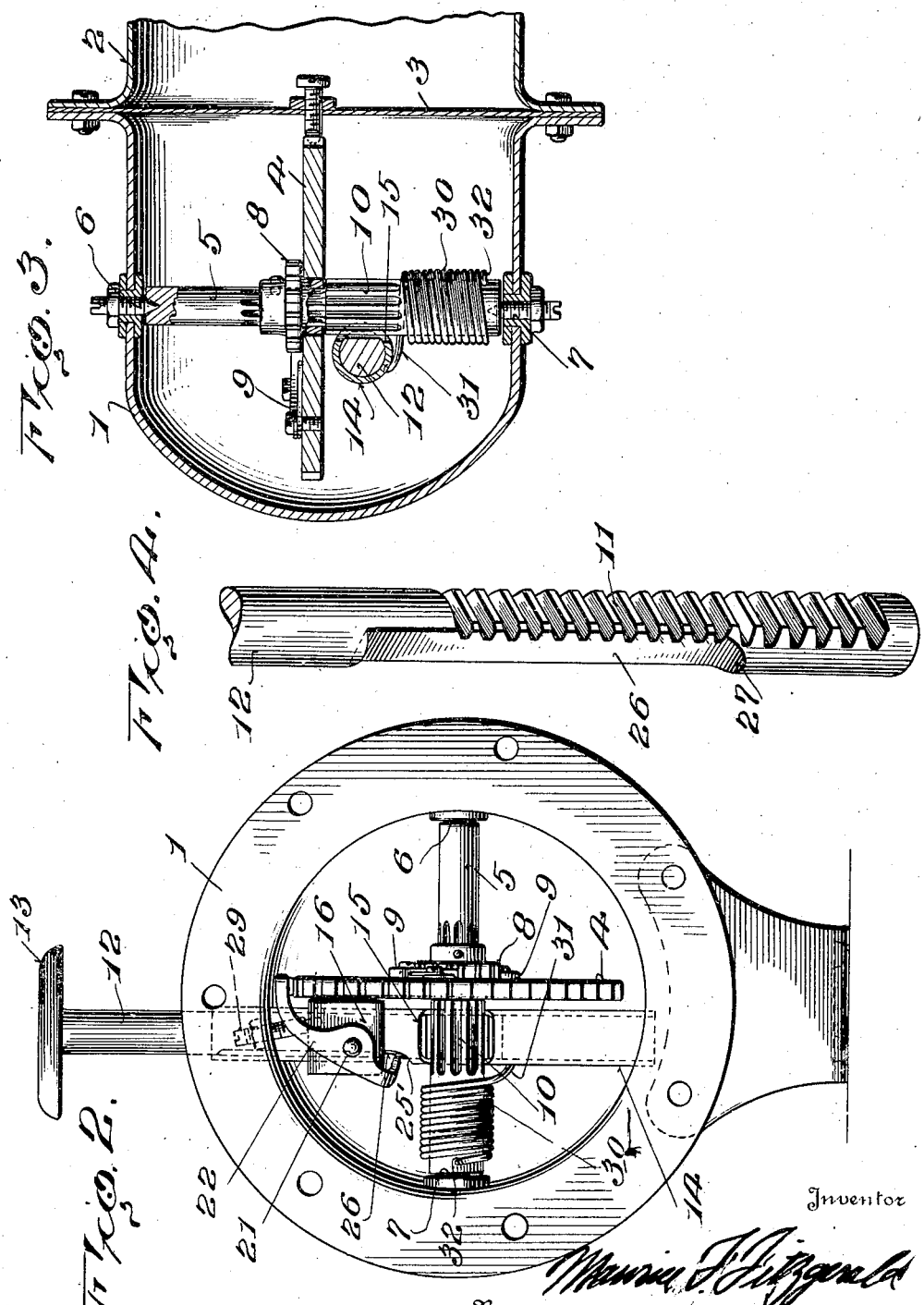

MAURICE F. FITZGERALD, OF WINSTED, CONNECTICUT, ASSIGNOR TO THE FITZGERALD MFG. CO., OF TORRINGTON, CONNECTICUT, A CORPORATION OF CONNECTICUT.

AUTOMOBILE-HORN.

1,353,575. Specification of Letters Patent. Patented Sept. 21, 1920.

Application filed June 28, 1920. Serial No. 392,289.

*To all whom it may concern:*

Be it known that I, MAURICE F. FITZGERALD, a citizen of the United States, residing at Winsted, in the county of Litchfield, State of Connecticut, have invented certain new and useful Improvements in Automobile-Horns, of which the following is a description, reference being had to the accompanying drawing and to the figures of reference marked thereon.

This invention relates to automobile horns, and more particularly to a means for preventing the objectionable rattling of these horns when the vehicle is in motion.

The general type of automobile horn includes a diaphragm which is vibrated by means of a rotating notched wheel, which wheel in turn is rotated by means of a pawl and ratchet mechanism actuated by a pinion geared to a hand-operated rack. The pawl and ratchet mechanism is used to utilize the inertia of the rotating wheel, and in order to permit this wheel to over-run its driving shaft, it must thus necessarily be freely mounted thereon. As a result of such construction, when the horn is not being sounded, and when the automobile is in motion, this inertia wheel has a slight lateral play which produces an objectionable rattling noise.

The main object of this invention is to provide a means for preventing this rattling of the inertia wheel, which means comprises a detent normally holding the inertia wheel stationary, and which detent is actuated directly by the hand-operated rack on the initial operation of the horn so that the detent is automatically moved out of its locking position.

A more specific object of this invention resides in constructing this anti-rattling device in the form of a pivoted locking member which normally engages the notches in the inertia wheel to hold such wheel stationary. This locking member is provided with a portion lying in the path of reciprocation of the hand-operated rack, which in turn is provided with a cam surface for swinging the locking member about its pivot to release said wheel for actuating the diaphragm.

A further object of this invention resides in adjustably mounting the wheel locking member in relation to the inertia wheel so that the proper locking adjustments can be readily made.

These and other objects will in part be obvious and will in part be hereinafter more fully disclosed.

Referring more particularly to the accompanying drawing:—

Figure 1 is a side sectional view of the horn, some of the parts being shown in elevation;

Fig. 2 is a front view of the horn with the diaphragm and amplifier removed;

Fig. 3 is a sectional view of the horn looking down from the top thereof;

Fig. 4 is a perspective view of the rack with the detent operating cam;

Fig. 5 is a partially perspective view of the bearing sleeve in which the hand-operated rack reciprocates, and Fig. 6 is a perspective view of the detent bracket with the detent in position thereon.

In general, the invention comprises the usual automobile horn including the sound diaphragm together with the rotatable shaft on which is loosely mounted the inertia wheel for vibrating the diaphragm. This wheel is driven from the shaft by means of the usual pawl and ratchet connections, and the shaft in turn is provided with teeth gearing with the hand-operated rack. Adjustably connected to the horn casing adjacent the inertia wheel is a suitably formed bracket upon which is mounted a detent having a portion normally engaging the inertia wheel, and a second portion lying in the path of movement of the rack bar which in turn is provided with a cam surface adapted on initial movement of the rack to move the detent out of contact with the inertia wheel so that the latter can be freely operated by the actuating mechanism.

Referring more particularly to the accompanying drawing, the horn comprises the usual casing 1 and the amplifier 2, to which is secured the usual diaphragm 3 vibrated by means of the inertia wheel 4 mounted on the shaft 5 rotatable in the bearings 6 and 7 in the casing 1. As in the usual construction, this inertia wheel 4 is freely mounted on the shaft 5, but is driven therefrom by means of the ratchet sleeve 8 secured in any suitable manner to the shaft 5 and the spring pressed pawls 9 mounted in the inertia wheel. At any suitable point, the shaft 5 is provided with gear teeth 10, integral if desired, which in turn mesh with gear teeth 11 formed on the rack 12, which is in the form of a plunger projecting through the top of the horn casing and terminating in a handle 13. In the preferred construction, this rack 12 is reciprocably housed in the sleeve 14 suitably mounted in the horn casing, and such sleeve is provided with a cut-away portion 15 so that the teeth 11 of the rack can mesh with the teeth 10 of the shaft 5.

In order to provide means for holding the inertia wheel normally stationary, that is, secure against movement when the horn is inoperative, so that the inertia wheel cannot rattle, there is provided a substantially U-shaped bracket 16, the furcations or arms 17 and 18 of which are provided with bores 19 and 20 through which the sleeve 14 passes. As is plainly shown in the drawings, this bracket is thus mounted on the sleeve 14 adjacent the inertia wheel. Pivotally mounted to the bracket 16 as at 21, is a locking detent or member 22, formed with a curved arm 23 provided with a locking pawl 24 which, in the preferred form, passes partly circumferentially of the inertia wheel 4 and is normally in locking engagement with the notches thereof. This member 22 is also provided with a portion 25 arranged in the path of movement of the rack 12 which is provided with a cut-away portion 26, and a raised portion 27 adapted to permit the proper swinging movement of this locking detent. In order to allow the toe 25 to contact with the cam portions of the rack 12 as thus described, the hollow sleeve 14 is provided with a second cut-away portion 25' as shown in Fig. 5.

The bracket is provided with an adjustable mounting relative to the casing, and the inertia wheel so that the locking pawl 24 may be adjusted to and from the periphery of the wheel, and the simple manner of providing such adjustments, comprises the adjusting screw 29 passing through the wall of the casing and into a suitable opening 28 in the bracket so that by rotating the screw 29 the bracket can be raised or lowered on the sleeve 14.

In the operation of the device, when the plunger rack 12 is pushed downwardly, the high portion 27 thereof moves from under the toe 25 of the detent thereby permitting the low portion 26 to pass under the same so that the locking pawl 24 can swing by gravity away from the notched periphery of the inertia wheel. At the same time, through the teeth 11 on the rack 12 and the teeth 10 on the shaft 5, the latter is rotated to actuate through the pawl and ratchet mechanism the inertia wheel 4 which in turn vibrates the diaphragm. As the shaft 5 is rotated, the usual springs 30 connected to the casing as at 31, and to the shaft 5 as at 32, is wound up, and upon completion of the inward movement of the plunger, the spring will return the plunger to normal outward position, at which time, the high portion 27 of the rack 12 will again cam under the toe 25 of the detent 23 forcing the locking pawl 24 into firm contact with the periphery of the inertia wheel whereby the same is held in fixed position and the tendency for the same to move and rattle is thus eliminated.

It will be obvious to those skilled in the art that instead of having the detent 23 gravity actuated by means of the cam portions 26 and 27, suitable springs may be provided, and the cam surfaces altered to accomplish this function.

It is obvious that the present device is entirely automatic in its operation; that it is composed of a few number of parts, simple in construction and readily assembled, and that such a construction provides a very effective means for entirely overcoming the tendency of the inertia wheel to rattle.

It is obvious that minor changes in the details of construction and the arrangement of the parts may be made without departing from the spirit of the invention as set forth in the appended claims.

Having thus described the invention, what I claim as new and desire to secure by Letters-Patent, is—

1. An automobile horn comprising a sound diaphragm, a shaft having teeth thereon, a rack engaging said teeth for rotating said shaft, an inertia wheel driven by said shaft to vibrate said diaphragm, a detent normally contacting with said wheel to hold the same from rattling, and means on said rack for moving said detent out of contact with said wheel upon the operation of said horn.

2. An automobile horn comprising a horn casing, a diaphragm, a toothed shaft, a rack engaging said teeth for rotating said shaft, an inertia wheel driven by said shaft to vibrate said diaphragm, a detent pivoted to said casing and having an arm normally contacting said wheel to hold the same from rattling, and an arm disposed adjacent said rack, said rack having a cam surface adapted to operate said arm on initial movement to swing the detent out of contact with said wheel.

3. A device of the character described comprising a horn casing including a rotatable shaft provided with gear teeth, an inertia wheel driven by said shaft, a diaphragm vibrated by said wheel, a hollow sleeve secured in said casing transversely to said shaft, a hand-operated rack reciprocable in said sleeve and gearing with said toothed shaft, a substantially U-shaped bracket adjustably secured to said casing, the furcations of said bracket being bored to receive said sleeve, a detent pivoted to said bracket, said detent having an arm normally engaging said wheel and a second arm lying in the path of movement of said rack, and means on said rack for swinging said detent free of said wheel on operation of said rack.

4. An anti-rattling automobile horn comprising a diaphragm, a toothed rotatable shaft, an inertia wheel having a pawl and ratchet connection with said shaft, a hand-operated rack meshing with the teeth of said rotatable shaft, a detent adapted to engage said inertia wheel and means for operating said detent to cause the same to engage the inertia wheel when said rack is in normal idle position.

In testimony whereof I affix my signature.

MAURICE F. FITZGERALD.